Sept. 7, 1965 R. G. LOUGHARY 3,204,982
ANTI-SCRAPER DEVICE FOR MOTOR VEHICLES
Filed Aug. 7, 1963 2 Sheets-Sheet 1
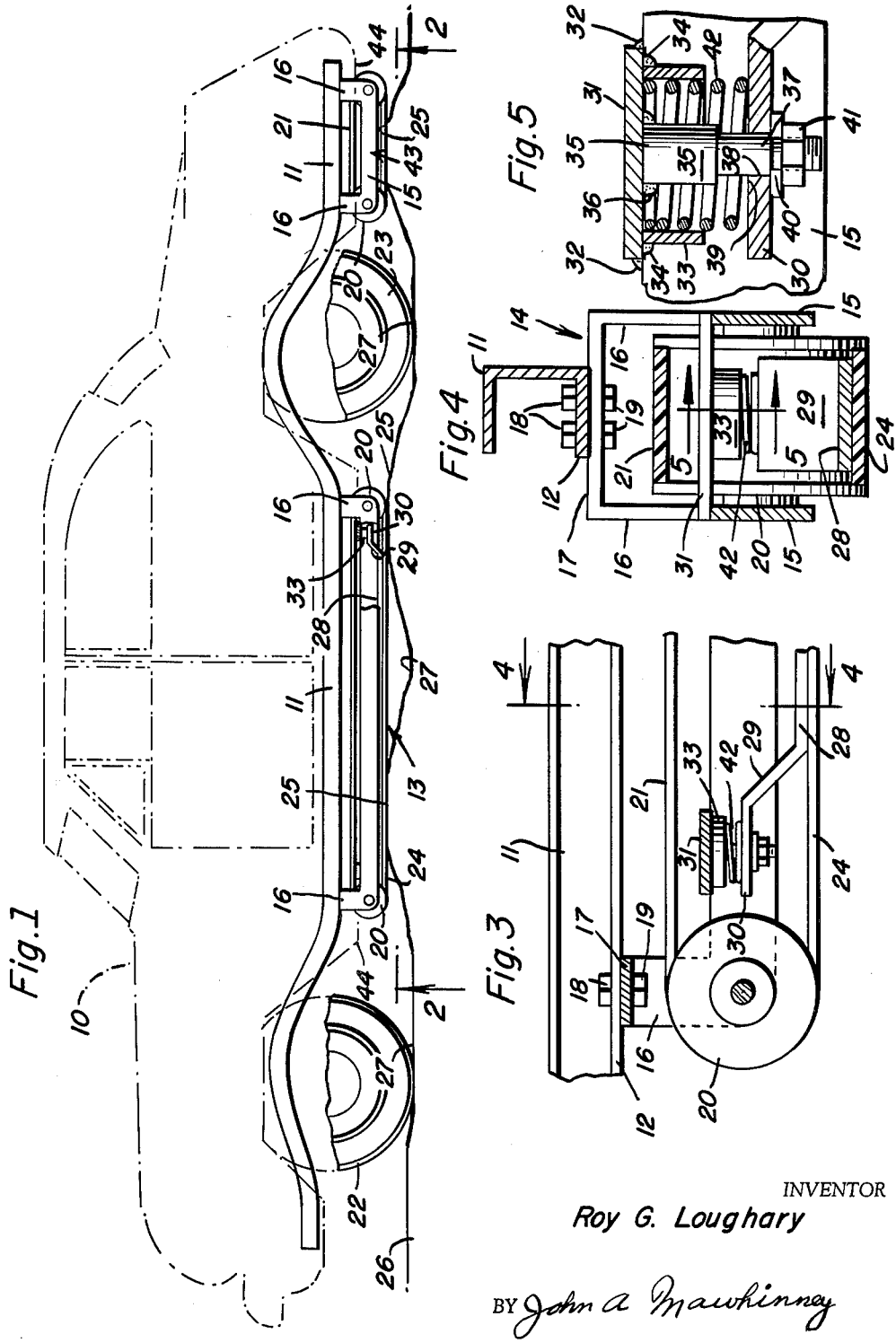
INVENTOR
Roy G. Loughary
BY John A. Mawhinney
ATTORNEY Sept. 7, 1965 R. G. LOUGHARY 3,204,982
ANTI-SCRAPER DEVICE FOR MOTOR VEHICLES
Filed Aug. 7, 1963 2 Sheets-Sheet 2
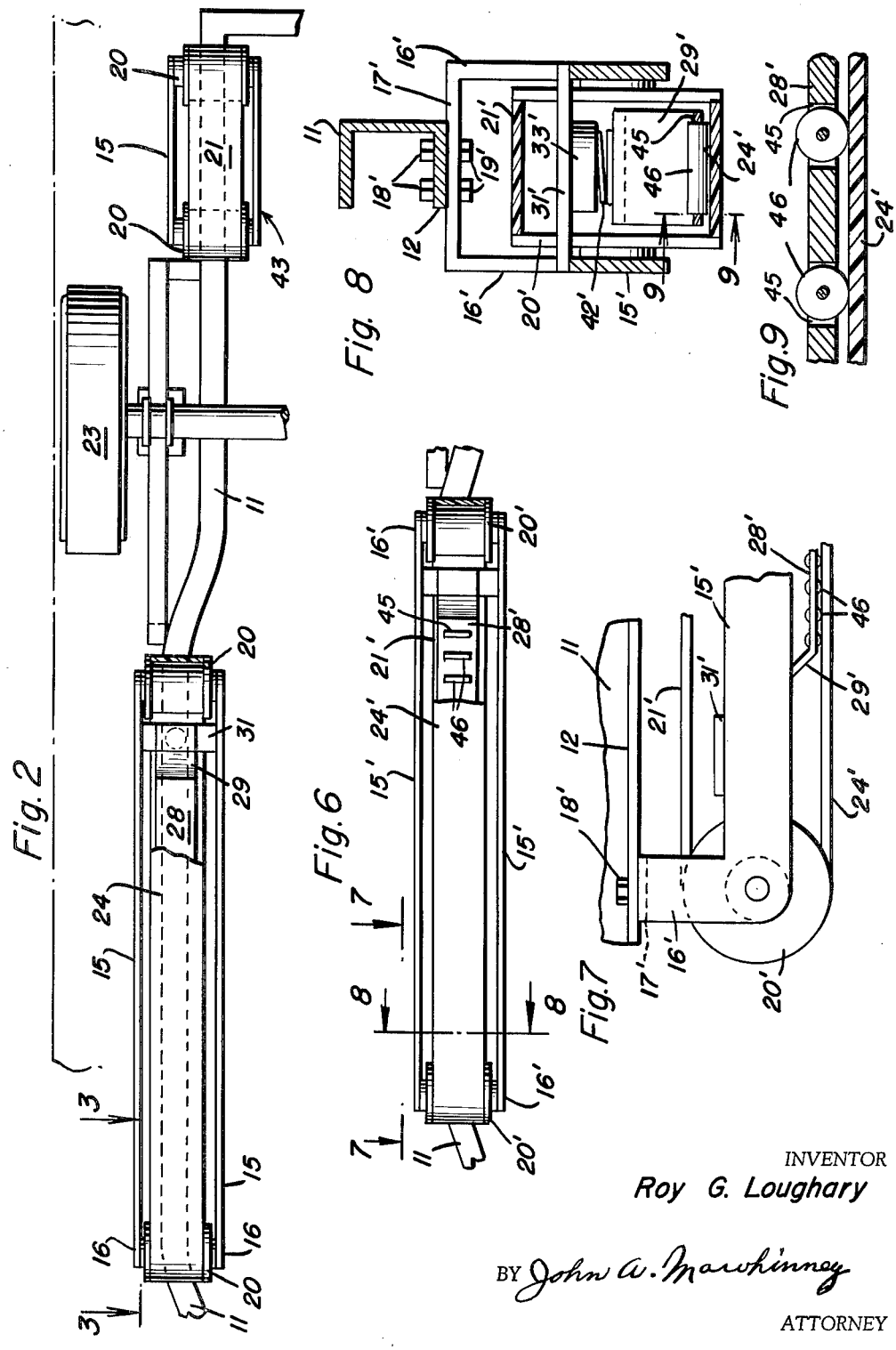
INVENTOR
Roy G. Loughary
BY John A. Mawhinney
ATTORNEY

United States Patent Office 3,204,982
Patented Sept. 7, 1965

3,204,982
ANTI-SCRAPER DEVICE FOR MOTOR VEHICLES
Roy G. Loughary, P.O. Box 6727, Portland 66, Oreg.
Filed Aug. 7, 1963, Ser. No. 300,531
2 Claims. (Cl. 280—150)

The present invention relates to an anti-scraper device for motor vehicles and has for an object to provide a device of this kind which will prevent damage and annoying scraping of the underside of motor vehicles when they are travelling over rough terrain or bad roads which have low points or depressions therein defining therebetween high points or raised portions of the road.

The present invention is particularly useful and helpful when used on modern low slung vehicles, both pleasure and military, and may also be used advantageously on trail machines which are similar to scooters only geared much lower and are usually provided with a knobby or tractor tired wheel on the rear end, such as the "Tote-Goat," "Pack-Mule" and "Mustang." These are very popular vehicles which are used extensively in the western part of the United States on mountain trails and the like.

This invention will also protect the undercarriage of the vehicle to which it is applied and the lower edges of the body and fenders thereof.

The present anti-scraper device will also be of assistance in preventing the vehicle from getting "stuck" when the undercarriage or the lower edge of the vehicle or bumper might come into contact with an obstruction or a high point in the road, since a portion of the device is movable relative to the vehicle and this movable part would engage the high point in the road.

In one of its broadest aspects, the present invention contemplates the provision of an anti-scraper device for motor vehicles comprising mounting means adapted to be secured to the undercarriage of the vehicle, a flexible member carried by said means so that it extends below the undercarriage and the body of the vehicle in a position to have its underface engage any high point in the road over which the vehicle may be travelling and a backing plate carried by said means in engagement with the upper face of said resilient member.

More specifically the present invention contemplates the provision of an anti-scraper device for motor vehicles comprising an inverted U-shaped supporting bracket adapted to be secured to each of the longitudinally extending channel beams of the undercarriage of the vehicle, a roller mounted adjacent each end of said bracket, an endless belt entrained about said rollers and positioned so that the lower run of the belt extends below the undercarriage and the body of the vehicle in a position to have the underface of the lower run of the belt engage any high point in the road over which the vehicle may be travelling, a rigid backing plate engaging the upper face of the lower run of the belt and means for urging the backing plate resiliently into contact with the upper face of the lower run of the belt.

A further object of the present invention is to provide a device of this character which can be mounted on vehicles already in service or mounted on vehicles at the time of their manufacture without altering or modifying the structure of the vehicle other than to provide appropriate openings in the longitudinally extending frame beam of the vehicle for the reception of bolts and nuts or rivets by means of which the mounting bracket of the device may be secured to said beam or the mounting bracket may be secured to the beam by welding thereto, thus eliminating the necessity of forming holes in the frame beam.

Other objects, features and advantages of my invention will be apparent from the following description when considered together with the accompanying drawings.

In the drawings, wherein like reference numerals denote corresponding parts throughout the several views:

FIGURE 1 is a side elevational view showing a pleasure motor vehicle in phantom lines to which a device constructed in accordance with the present invention is shown as applied to the frame beam of the vehicle between the front and rear wheels and also rearwardly of the rear wheels of the vehicle;

FIGURE 2 is a bottom plan view taken on the line 2—2 of FIGURE 1 with parts broken away and parts in section;

FIGURE 3 is a sectional view taken on the line 3—3 of FIGURE 2;

FIGURE 4 is a sectional view taken on the line 4—4 of FIGURE 3;

FIGURE 5 is a sectional view taken on the line 5—5 of FIGURE 4;

FIGURE 6 is a view similar to FIGURE 2 but showing a modified form of the invention;

FIGURE 7 is a sectional view taken on the line 7—7 of FIGURE 6;

FIGURE 8 is a sectional view taken on the line 8—8 of FIGURE 6 but on an enlarged scale, and FIGURE 9 is a sectional view taken on the line 9—9 of FIGURE 8.

Referring more particularly to the drawings, 10 indicates a pleasure motor vehicle having the conventional undercarriage which includes longitudinally extending channel frame beams 11 adjacent each side of the vehicle. It will be noted that these channel beams 11 run longitudinally of the vehicle for substantially the entire length thereof and each beam is provided with a lower horizontal flange 12 upon which the anti-scraper device of the present invention is secured.

This anti-scraper device is generally indicated at 13 and comprises an inverted U-shaped mounting bracket generally indicated at 14 having two parallel spaced-apart downwardly extending sides 15. At each of their end portions the sides 15 have vertically offset leg portions 16 which extend upwardly beyond the upper edges of the main body portions of the sides 15. These leg portions 16 and the sides 15 are held in properly spaced-apart relation by closed top plates 17. Each of these top plates 17 is provided with a pair of openings which are brought into alignment with suitable openings formed in the lower flange 12 of the beam 11. The mounting brackets 14 are secured to the beams 11 by means of bolts or the like 18 which extend downwardly through the alined openings in the flange 12 and the top plates 17 to receive nuts 19 by means of which the bracket 14 is secured to the beam 11.

Flanged rollers 20 are rotatably mounted at opposite ends of the bracket 14 in the leg portions 16 thereof. An endless belt 21 is entrained over the rollers 20 and is prevented from slipping off the rollers laterally by the flanges of the rollers.

It will be noted from FIGURE 1 of the drawings that the bracket 14 of the anti-scraper device 13 is mounted between the front wheels 22 and rear wheels 23 in such a position that the lower run 24 of the endless belt 21 will engage the high points 25 formed in the road 26 by virtue of the depressions 27. Undue upwardly directed flexing of the lower run 24 of the endless belt 21 which might cause binding of the endless belt on the rollers 20 is prevented by the provision of a rigid backing plate 28 which may be made of metal or other suitable material. The backing plate 28 extends longitudinally of the lower run 24 of the belt 21 for the greater portion of the length of the lower run of the endless belt and in contact with the upper face thereof.

The backing plate 28 comprises an enlongated main body portion and upwardly offset portions 29 at each end of the main body portions, which offset portions 29 terminate in end portions 30 which are substantially parallel but spaced vertically above the main body portion 28. The backing plate 28 is resiliently mounted on the sides 15 of the mounting bracket 14. This resilient mounting at each end of the backing plate comprises a top plate 31 which extends across the space between the sides 15 of the bracket 14 and rests upon the upper edges of the sides 15 and is secured thereto as by welding 32 or the like.

A circular skirt 33 depends downwardly from the top plate 31 to which it is secured as by welding 34 or the like. A stem 35 is secured as by welding 36 or the like to the undersurface of the top plate 31 and extends downwardly therefrom. The stem 35 is provided adjacent its lower end position with a reduced diameter portion 37 which extends through a suitable opening 38 provided in the terminal end portion 30 of the backing plate 28. The provision of the reduced diameter portion 37 of the stem 35 provides a downwardly facing shoulder 39 which abuts against the upper surface of the end portion 30 surrounding the opening 38. The extreme lower end portion of the reduced portion 37 of the stem 35 is screw-threaded for the reception of a lock nut 40 and nut 41. A coil spring 42 is confined between the top plate 31 and the upper face of the end portion 30 of the backing plate 28, and the upper end portion of the spring 42 is housed within the circular skirt 33.

In the use of the invention, one of the anti-scraper devices 13 is attached to each of the frame beams 11 at opposite sides of the motor vehicle 10, as illustrated in FIGURE 1 of the drawings, and similar anti-scraper devices indicated at 43 are secured to the frame beams 11 rearwardly of the rear wheels 23 as shown in FIGURE 1 of the drawings. Each of the devices 43 is identical to the devices 13 except that the devices 43 are shorter in length than the devices 13.

As the car travels along the roadway 26 towards the left looking at FIGURE 1 of the drawings, as the wheels 22 and 23 enter depressions 27 the undersurfaces of the lower runs 24 of the endless belts 21 of the devices 13 and 43 will come into contact with the high points 25 of the roadway 26. If the anti-scraper devices of the present invention were not mounted on the vehicle 10 the lower edge portions 44 of the vehicle would scrape along these high points 25 and cause damage thereto as well as producing an annoying scraping noise. Since the lower runs 24 of the endless belt 21 are flexible and the backing plate 28 is resiliently mounted, the lower run 24 of the belt and the backing plate 28 will move upwardly slightly to prevent binding of the belt on the high points 25. Since the rollers 20 are rotatably mounted the belt and rollers will move with respect to the vehicle 10 in a direction opposite to that in which the vehicle is travelling so that there will be no binding action between the lower run of the belt and the high points 25. The endless belt 21 may be made of any suitable material for the purpose but it has been found that nylon is a very desirable material to use as it is tough and has a slickness that helps the action considerably. Also if desirable the undersurface of the backing plate 28 may be coated with a slippery substance such as grease or the like so that the lower run of the belt can move longitudinally of the vehicle with respect to the backing plate 28.

If the rollers 20 contact the high points 25 of the roadway 26 the rotation of the rollers induced by such contact will aid in the movement of the lower run 24 of the belt, and thereby enhance the desired action.

In FIGURES 6 through 9 of the drawings a modified form of the backing plate is illustrated. In these FIGURES 6 through 9 the same reference numerals primed are used for the similar parts illustrated in FIGURES 1 through 5.

In this form of the invention the main body portion of the backing plate 28' is provided with a series of longitudinally spaced-apart slots or pockets 45. In each of the slots or pockets 45 there is mounted for rotation therein rollers 46. The rollers are provided with trunnions or pins 47 which are received by suitable recesses or sockets formed in the side walls of the slots 45 of the backing plate 28'. For facilitating assembly of the rollers 46 in the slots 45, at least one of the trunnions 47 may be spring-loaded similar to the spring loading of one of the trunnions in the roller for a roll of toilet paper, but of course the structure would be made appropriately stronger for the use here intended. The rollers 20 and 20' may be similarly mounted in the mounting brackets 14 and 14'.

It will be noted that the diameter of the rollers 46 are greater than the thickness of the backing plate 28' so that the lower portions of the rollers 46 will project downwardly beyond the lower face of the backing plate 28' and engage the upper face of the lower run 24' of the endless belt 21' to facilitate the relative movement in a longitudinal direction of the lower run of the belt with respect to the backing plate.

A similar arrangement is made for the backing plate of the anti-scraper device 43 and the operation of the anti-scraper devices 13' and 43 as modified would be the same as the devices 13 and 43.

Devices constructed in accordance with the present invention can be applied to any vehicle having parts which would scrape against or contact high points in the roadway over which it is travelling.

While I have described preferred embodiments of my invention, it is understood that this disclosure is for the purpose of illustration and that various omissions, or changes in arrangement of parts, as well as the substitution of equivalent elements for those herein shown and described, may be made without departing from the spirit and scope of the invention as set forth in the appended claims.

What I claim is:

1. An anti-scraper device for motor vehicles comprising mounting means adapted to be secured to the undercarriage of the vehicle, a flexible member carried by said means spaced above the normal road surface and so that it extends below the undercarriage and the body of the vehicle in a position to have its underface engage any high point in the road over which the vehicle may be traveling, said flexible member being mounted for free motion so that through the mentioned engagement motion will be imparted to the underface, a backing plate carried by said means in engagement with the upperface of said member, two spaced-apart rollers being freely rotatably carried by said mounting means, said flexible member comprising an endless belt entrained about said rollers, said backing plate engaging the upperface of the lower run of said belt, said mounting means comprising an elongated bracket adapted to be secured to the side channel-frame member of the vehicle undercarriage and to extend longitudinally thereof, said rollers being carried by said bracket adjacent opposite ends thereof, said bracket being of inverted U-shape in cross-section and having upstanding end portions, means for securing said upstanding end portions to the side channel-frame member, means for resiliently urging the backing plate into engagement with the flexible member comprising a cup-shaped member having a top plate secured to the upper edges of the bracket and having a depending skirt extending downwardly therefrom, a stem extending downwardly from the top plate and disposed centrally of the skirt, said stem extending downwardly and slidable through a hole in said backing plate, the roller end portion of the stem being screw-threaded, a nut and lock washer on said screw-threaded portion of the stem, and a coiled spring encircling the upper portion of the stem and confined between the top plate and the vacuum plate, the upper portion of the spring being housed within the skirt.

2. An anti-scraper device for motor vehicles having mounting means comprising upright brackets provided with side members, upwardly extending legs at each end of each side member, top plates adapted to be attached to the undercarriage of the vehicle, said top plates joining said legs and being located between and spacing said side members apart, a wheel journaled for free rotation on a horizontal axis at each end of the mounting means between said brackets, an endless flexible member trained over said wheels and arranged for free motion imparted through the engagement of the lower run of said endless member with a high point in the road, a backing member adjacent the inner surface of the said lower run, and means fastening said backing member to said side members for resilient vertical movement, stems depending from the mounting means intermediate the brackets and slidably through opposite end portions of said backing member, and cushioning springs engaging said backing plates and surrounding said stems.

References Cited by the Examiner
UNITED STATES PATENTS

| | | | |
|---|---|---|---|
| 1,534,514 | 4/25 | Gehrung | 180—9.28 |
| 2,051,496 | 8/36 | Sarragin | 180—9.3 X |
| 2,317,412 | 4/43 | Shaffer | 280—150 X |
| 2,434,693 | 1/48 | Graham | 280—104.5 X |
| 2,627,442 | 2/53 | Junker | 280—104.5 X |
| 2,834,608 | 5/58 | Wixson | 280—150 |
| 2,841,407 | 7/58 | Arnao | 305—35 X |
| 2,996,133 | 8/61 | Warre | 180—9.22 |

BENJAMIN HERSH, *Primary Examiner.*

A. HARRY LEVY, *Examiner.*